United States Patent [19]

Schofield et al.

[11] Patent Number: 5,367,159
[45] Date of Patent: Nov. 22, 1994

[54] OPTICAL LOOPBACK TESTER WITH AIR GAP ATTENUATOR

[75] Inventors: Philip W. Schofield, Oak Park; Paul R. Stonikas, Darien; James W. McGinley, Schaumburg, all of Ill.

[73] Assignee: Methode Electronics, Inc., Chicago, Ill.

[21] Appl. No.: 935,005

[22] Filed: Aug. 25, 1992

[51] Int. Cl.⁵ .............................................. H01J 5/16
[52] U.S. Cl. ................................ 250/227.11; 385/140
[58] Field of Search ...................... 250/227.11, 227.24, 250/227.28, 227.21; 356/73.1; 385/140

[56] References Cited

U.S. PATENT DOCUMENTS

| | | | |
|---|---|---|---|
| 4,145,110 | 3/1979 | Szentesi | 385/140 |
| 4,666,243 | 5/1987 | Rogstadius et al. | 385/140 |
| 4,893,889 | 1/1990 | Iwakiri et al. | 385/140 |
| 4,979,793 | 12/1990 | Bowen et al. | 385/140 |
| 4,982,983 | 1/1991 | Graham et al. | 250/227.11 |
| 5,050,956 | 9/1991 | Carpenter et al. | 385/140 |
| 5,109,468 | 4/1992 | Tamulevich et al. | 385/140 |
| 5,127,084 | 6/1992 | Takahashi | 385/140 |
| 5,136,681 | 8/1992 | Takahashi | 385/140 |
| 5,187,768 | 2/1993 | Ott et al. | 385/140 |

FOREIGN PATENT DOCUMENTS

| | | | |
|---|---|---|---|
| 4031801 | 2/1992 | Japan | 385/140 |
| 4116604 | 4/1992 | Japan | 385/140 |
| 4133005 | 5/1992 | Japan | 385/140 |

Primary Examiner—David C. Nelms
Attorney, Agent, or Firm—David L. Newman

[57] ABSTRACT

An FDDI loopback connector or optical network is suitable for testing in fiber-to-fiber applications and designed to be interchangeable with a complimentary connector. The loopback tester is afforded a desired level of attenuation by providing a fiber loop having a controlled air gap. Adjustment of the air gap will afford a desired attenuation level.

16 Claims, 1 Drawing Sheet

OPTICAL LOOPBACK TESTER WITH AIR GAP ATTENUATOR

BACKGROUND OF THE INVENTION

The present invention relates to an optical network tester shaped to be interchangeable with a complementary connector or generic fiber termini that intermates with an optical connector having both an optical emitter and an optical detector. The optical network tester comprises an alignment fixture having a pair of connectors or alignment ferrules for intermating it with the optical emitter and the optical detector.

The foregoing alignment fixture includes an optical fiber formed in a loop and installed within the alignment fixture with a first end face of the loop aligned through a corresponding alignment ferrule with an emitter, and a second end face of the loop aligned through a corresponding alignment ferule with the detector of the optical connector. In accordance with the present invention, a controlled air gap is added to the optical fiber loop to provide a desired level of attenuation.

It is known in the art to provide an optical network tester of the type generally described above, including the use of an optical fiber loop mounted in an alignment fixture. However, a desired level of attenuation is normally provided by use of a piece of filter glass which may be mounted on the end face of one of the above-mentioned alignment ferrules. Such an optical simulator is described in U.S. Pat. No. 4,982,083.

The foregoing patent shows in FIG. 1 a simulator 10 which is interchangeable with a complementary connector 7 for insertion into a transceiver adapter assembly 6 which includes an optical transmitter 2 and an optical receiver 3. As shown in FIG. 3 of the '083 patent, the simulator 10 includes an optical fiber 11 formed in a loop and having one end located in an alignment ferrule 23 facing an optical detector 5 and having its other end located in an alignment ferrule 24 facing an optical emitter 4.

As best shown in FIGS. 4A and 4B, the '083 patent discloses means of providing a desired level of attenuation comprising a square of filter glass 43 which is mounted on the end face 37 of the alignment ferrule 23. By thus attaching the filter glass 43 at one end of the optical fiber loop which faces the detector 5, the filter glass affords the desired attenuation of optical power to the optical detector.

Referring again to FIG. 1 of U.S. Pat. No. 4,982,083, in the testing of the optical transmitter 2, it is an object to determine whether the transmitter is transmitting an amount of light consistent with the required specifications for the transmitter, and such light output will be measured at the receiver 3. However, rather than plugging in the connector 7 and transmit through the cables 8 and 9 and check at the other end of the system, it is advantageous to utilize the simulator 10 in such a manner that the fiber loop 11 simulates the attenuation which would be achieved if the connector 7 and cables 8 and 9 were utilized. Thus, the object of such a simulator 10 is to check the dynamic range of the equipment, which is the amount of optical power transmitted by the emitter, and the simulator 10 serves the purpose of simulating the loss or attenuation in the system including the cables 8 and 9.

One significant disadvantage of the device disclosed in the '083 patent is the use of the filter glass shown at 43 in FIGS. 4A and 4B to provide the desired attenuation. Such a small square of filter glass must be microscopically applied to the end of the fiber optic alignment ferrule and, after precisely locating the filter glass, it must be bonded in position. However, if any movement of the filter glass relative to the fiber optic end occurs during the bonding procedure, such movement can vary the amount of attenuation caused by the filter glass.

In using a filter glass as taught by the above-mentioned '083 patent, there are two critical factors which affect the level of attenuation. One factor is the precise thickness of the filter, and the other factor is the precise location of the filter relative to the end of the fiber optic. As a result, it is necessary to use different filters to achieve different levels of attenuation. In addition, a very delicate operation is involved in bonding the tiny filter on the end of the alignment ferrule in a precise position relative to the fiber optic to achieve the expected level of attenuation.

SUMMARY OF THE INVENTION

It is an object of the present invention to provide an improved means of attenuation for a loopback optical fiber by introducing an air gap into the fiber.

Another object of the present invention is to provide means for providing an adjustable air gap so that by merely adjusting the length of the air gap it is possible to vary the desired level of attenuation affected by the air gap.

A further object of the present invention is to provide an optical network loopback tester with attenuator of the type above-mentioned which is miniaturized to fit within an FDDI connector housing.

The foregoing and other objects and advantages of the present invention will be apparent from the following description of a preferred embodiment, taken in conjunction with the accompanying drawings.

Now, in order to acquaint those skilled in the art with the manner of making and using the present invention, we shall describe, in conjunction with the accompanying drawings, a preferred embodiment of the invention.

DETAILED DESCRIPTION OF THE INVENTION

Figure 1:
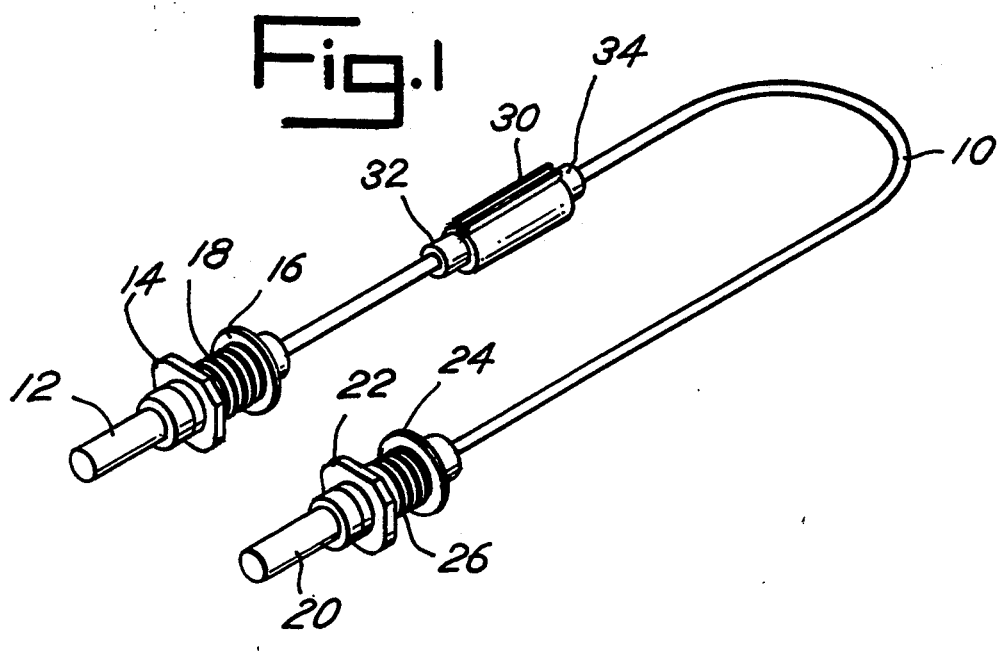
FIG. 1 is a perspective view of an optical fiber bent into a loop with each of the ends of the optical fiber being associated with a corresponding FDDI backbone and ferrule assembly comprising a fiber connector, alignment ferrule, rear flange and compression spring member, there being further shown a device for introducing an adjustable air gap in one of the straight sections of the fiber loop.

FIG. 1 shows a fiber optic cable 10 bent into the form of a loop for the purpose described above and also described in U.S. Pat. No. 4,982,083. One end of the fiber optic cable 10 is mounted in an alignment ferrule 12 which is associated with a known fiber connector 14 including a rear flange 16 and intermediate compression spring 18. When the assembly shown in FIG. 1 is mounted in an FDDI connector housing, as shown at 10 in FIG. 1 of the '083 patent, the compression spring 18 will yieldingly resist movement of the ferrule 12 to the right as viewed in FIG. 1

The other end of the fiber optic cable 10 is mounted in an alignment ferrule 20 which is associated with a known fiber connector 22 including a rear flange 24 and intermediate compression spring 26. The members 14 and 22 may also be described as FDDI backbone and ferrule 34 assemblies.

FIG. 1 further shows a split sleeve 30 and a pair of relatively movable ferrules 32 and 34. The purpose of the split sleeve 30 and the ferrules 32 and 34 is to provide an adjustable air gap in accordance with the present invention to achieve a desired level of attenuation through adjustment of the air gap.

Figure 2:
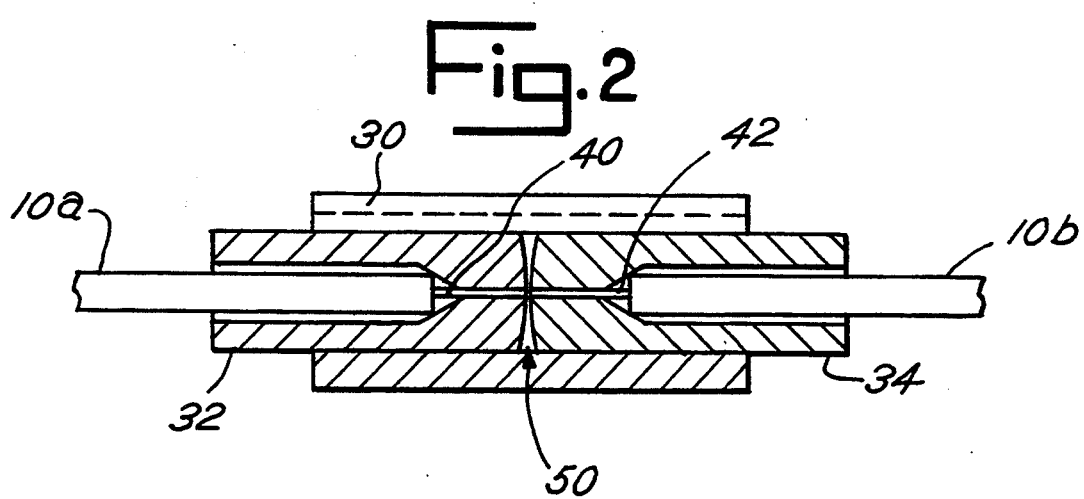
FIG. 2 is an enlarged sectional view showing the manner in which an adjustable air gap is achieved by use of a pair of aligned ferrules inserted into opposite ends of a split sleeve member.

As best shown in FIG. 2, the optical fiber is severed, and one end 10a of the optical fiber is mounted in the ferrule 32 with a projecting end of the fiber optic 40 extending into a small hole in the end of the ferrule 32 so as to be approximately flush with the end of the ferrule 32. Similarly, the other end 10b of the optical fiber is mounted in the ferrule 34 with a projecting end of the optical fiber 42 extending into a small hole in the end of the ferrule 34 so as to be approximately flush with the end of the ferrule.

One advantage of the foregoing arrangement is that the ferrules 32 and 34 may be the same type of ferrules as those shown in FIG. 1 at 12 and. 20, and thus standard ferrule components together with the split sleeve 30 can be used to provide an adjustable air gap in accordance with the present invention. The air gap is shown in FIG. 2 at 50, and the concept of providing an air gap is that, depending upon the length of the air gap between the opposed ends of the fiber optic members 10a and 10b, a given amount of light emitting from one optical fiber will be lost and not received by the opposing optical fiber. The larger the air gap, the greater the amount of light transmission which is lost, and therefore adjustment of the air gap can be utilized to control the level of attenuation.

The split sleeve 30 is preferably made of a thermal plastic material such as a liquid crystal polymer, and the two ferrules 32 and 34 terminate respective ends of the severed fiber optic member which have the usual cladding thereon. The two ferrules 32 and 34 are pressed into opposite ends of the split sleeve 30, and the sleeve should be tight enough so that each ferrule will remain in the position to which it is manually inserted. One of the two ferrules may then be adjusted either closer or further from the opposed ferrule to vary the length of the air gap 50 and thereby vary the level of attenuation.

A known optical power meter may be used to measure the light being received at an optical detector, such as shown at 5 in FIG. 3 of the U.S. Pat. No. 4,982,083, transmitted from optical transmitter 4. In this manner, one can measure the amount of attenuation caused by the air gap. Thereafter, by manually moving one of the ferrules 32 and 34 toward or away from the other, the level of attenuation can be varied to a desired level. Once the desired level of attenuation has been achieved, any known type of adhesive or heat shrink epoxy may be applied over the split sleeve 30 and adjacent ferrules 32 and 34 to fix those components in position relative to one another.

By the foregoing procedure, it is a simple matter to adjust one of the ferrules 32 and 34 relative to the other to adjust the air gap 50 and the resultant attenuation as measured by an optical power meter, and thereafter the assembly may be sealed in position to fix the air gap. It will readily be understood that it is possible by the present invention to provide a variety of levels of attenuation using the same standard components, as opposed to requiring a large number of different thicknesses of filter glass in order to achieve different levels of attenuation. In addition, the adjustment of the air gap in accordance with the present invention is a simple procedure compared to the relatively delicate procedure required to accurately bond a piece of filter glass in a precise location on the end of an alignment ferrule.

It will now be understood that our invention utilizes a controlled air gap in an optical fiber loop, and the air gap serves the purpose of simulating the attenuation found in an optical network exceeding the intrinsic attenuation of the fiber loop per se.

It should be understood that various changes and modifications to the presently preferred embodiment described herein will be apparent to those skilled in the art. Such changes and modifications may be made without departing from the spirit and scope of the present invention and without diminishing its attendant advantages. It is therefore, intended that such changes and modifications be covered by the appended claims.

What is claimed is:

1. An optical network loopback tester shaped to be interchangeable with a complementary connector that intermates with an optical connector having an optical emitter and an optical detector said loopback detector comprising, in combination: an alignment fixture having a pair of fiber optic connectors for intermatting said optical emitter and said optical detector, respectively, and an optical fiber formed in a loop and mounted within said alignment fixture with one end of said fiber loop aligned through one of said fiber connectors with said emitter and the other end of said fiber loop aligned through the other one of said fiber optic connectors with said detector, and an air gap formed in said fiber loop to provide a predetermined attenuation of optical power to said detector, said air gap formed in a sleeve means frictionally holding two spaced ends of said fiber by a pair of holding means, one holding means being attached to each of the spaced ends of said sleeve and each of said holding means being frictionally inserted into opposite ends of the sleeve means which retains said spaced ends of said fiber in a desired spaced relation.

2. The optical network loopback tester as defined in claim 1 wherein said air gap is formed in one of two straight sections of said fiber loop.

3. The optical network loopback tester as defined in claim 1 wherein said air gap is adjustable to vary the attenuation level.

4. The optical network loopback tester as defined in claim 1 wherein said desired spaced relation is manually adjustable by moving one of said holding means relative to the other in said sleeve means.

5. The optical network loopback tester as defined in claim 1 wherein each of said holding means comprises a ferrule in which one of said two spaced ends of said fiber is mounted whereby the level of attenuation maybe adjusted by manually moving one of said ferrules in said sleeve means relative to the other of said ferrules.

6. The optical network loopback tester as defined in claim 5 wherein said ferrules are gripped by said sleeve means so that said ferrule will remain in the positions to which they are manually adjusted in said sleeve means.

7. The optical network loopback tester as defined in claim 6 wherein said sleeve means comprises a split sleeve.

8. The optical network loopback tester as defined in claim 6 wherein said sleeve means is made of a liquid crystal polymer.

9. An optical network loopback tester shaped to be interchangeable with a complementary connector that intermates with an optical connector having an optical emitter and an optical detector, said loopback detector comprising, in combination: an alignment fixture having a pair of fiber optic connectors for intermating with said optical emitter and said optical detector, respectively, and an optical fiber formed in a loop and mounted within said alignment fixture with one end of said fiber loop aligned through one of said fiber connectors with said emitter and the other end of said fiber loop aligned through the other one of said fiber optic connectors with said detector, and a variable air gap formed in said fiber loop in one of the two straight portions thereof comprising two spaced ends of said fiber which are held in spaced relation in respective first and second ferule means, said first and second ferrule means being frictionally inserted and frictionally held in opposite ends of a sleeve and being adjustably movable therein relative to one another to vary the level of attenuation created by the variable air gap between said two spaced ends of said fiber.

10. The optical network loopback tester as defined in claim 9 wherein said first and second ferrule means are manually adjustable within said sleeve.

11. The optical network loopback tester as defined in claim 9 wherein said sleeve means comprises a split sleeve made of a liquid crystal polymer.

12. A method of varying the level of attenuation in an optical fiber formed in a loop comprising the steps of:
creating an air gap in said fiber to form two spaced ends thereof, said air gap being formed in one of two straight sections of said fiber loop;
mounting said two spaced ends of said fiber in first and second ferrules;
frictionally inserting said first and second ferrules relative to one another in said sleeve to vary the air gap between said two spaced ends thereby to vary the level of attenuation in said fiber loop;
using an optical power meter to measure the optical power being transmitted through said fiber loop; and
adjusting the relative position of said first and second ferrules to obtain a desired level of attenuation in said fiber loop.

13. The method as defined in claim 12 further comprising the step of:
fixing the positions of said ferrules in said sleeve after a desired level of attenuation has been obtained.

14. A method of varying the level of attenuation in an optical fiber formed in a loop comprising the steps of:
creating an air gap in said fiber to form two spaced ends thereof;
mounting two spaced ends of said fiber in first and second holding means;
frictionally inserting said first and second holding means in opposite ends of a common sleeve means;
moving said sleeve means to vary the air gap between said two spaced ends thereby to vary the level of attenuation in said fiber loop; and
applying adhesive over said sleeve means and first and second holding means to maintain the relative position thereof after a desired level of attenuation has been achieved.

15. A method of varying the level of attenuation in an optical fiber formed in a loop comprising the steps of:
creating an air gap in said fiber to form two spaced ends thereof;
mounting two spaced ends of said fiber in first and second holding means;
frictionally inserting said first and second holding means in opposite ends of a common sleeve means;
moving said sleeve means to vary the air gap between said two spaced ends thereby to vary the level of attenuation in said fiber loop; and
applying heat shrink epoxy to said sleeve means and said first and second handling means to maintain the relative position thereof after a desired level of attenuation has been achieved.

16. A method of varying the level of attenuation in an optical fiber formed in a loop comprising the steps of:
creating an air gap in said fiber to form two spaced ends thereof;
mounting two spaced ends of said fiber in first and second holding means;
frictionally inserting said first and second holding means in opposite ends of a common sleeve means;
moving said sleeve means to vary the air gap between said two spaced ends thereby to vary the level of attenuation in said fiber loop; and
applying heat shrink epoxy to said sleeve means and said first and second handling means to maintain the relative position thereof after a desired level of attenuation has been achieved.

* * * * *